US011977305B2

(12) United States Patent
Muramoto et al.

(10) Patent No.: US 11,977,305 B2
(45) Date of Patent: May 7, 2024

(54) DISPLAY DEVICE

(71) Applicant: Japan Display Inc., Tokyo (JP)

(72) Inventors: Tatsunori Muramoto, Tokyo (JP); Kentaro Kawai, Tokyo (JP); Yoshihide Ohue, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/348,928

(22) Filed: Jul. 7, 2023

(65) Prior Publication Data

US 2023/0350253 A1 Nov. 2, 2023

Related U.S. Application Data

(63) Continuation of application No. PCT/JP2021/042293, filed on Nov. 17, 2021.

(30) Foreign Application Priority Data

Jan. 12, 2021 (JP) ................................ 2021-002855

(51) Int. Cl.
*G02F 1/1368* (2006.01)
*G02F 1/1362* (2006.01)

(52) U.S. Cl.
CPC .. *G02F 1/136286* (2013.01); *G02F 1/136209* (2013.01); *G02F 1/136227* (2013.01); *G02F 1/1368* (2013.01)

(58) Field of Classification Search
CPC .................................................... G02F 1/1368
See application file for complete search history.

(56) References Cited

U.S. PATENT DOCUMENTS

| 2012/0307172 A1 | 12/2012 | Yoshida |
| 2018/0031758 A1* | 2/2018 | Mizuno ............ G02F 1/133605 |
| 2021/0286226 A1 | 9/2021 | Sugiyama et al. |
| 2022/0004052 A1 | 1/2022 | Ohue |

FOREIGN PATENT DOCUMENTS

JP     2007-003903 A     1/2007

OTHER PUBLICATIONS

JP 2007003903 A translation (Year: 2007).*
International Search Report dated Feb. 8, 2022, for the corresponding PCT Application No. PCT/JP2021/042293, with English machine translation.

* cited by examiner

*Primary Examiner* — James A Dudek
(74) *Attorney, Agent, or Firm* — Michael Best & Friedrich LLP (57) ABSTRACT

According to one embodiment, a display device includes a first substrate including a scanning line extending along a first direction, a signal line extending along a second direction, a switching element, a first connection electrode, a pixel electrode, and a feed line, a second substrate, a liquid crystal layer containing polymer dispersed liquid crystal, and a light emitting module. The feed line includes an edge extending along the second direction. The first connection electrode is a transparent electrode formed of a same material as the feed line, extends along the first direction, and includes an end portion opposed to the edge.

7 Claims, 11 Drawing Sheets

DISPLAY DEVICE

CROSS-REFERENCE TO RELATED APPLICATIONS

This application is a Continuation Application of PCT Application No. PCT/JP2021/042293, filed Nov. 17, 2021 and based upon and claiming the benefit of priority from Japanese Patent Application No. 2021-002855, filed Jan. 12, 2021, the entire contents of all of which are incorporated herein by reference.

FIELD

Embodiments described herein relate generally to a display device.

BACKGROUND

In recent years, various display devices using a polymer dispersed liquid crystal capable of switching a scattering state in which incident light is scattered and a transparent state in which incident light is transmitted have been proposed. In one example, a display device comprising a first translucent substrate, a second translucent substrate, a liquid crystal layer containing polymer dispersed liquid crystal sealed between the first translucent substrate and the second translucent substrate, and at least one light emitting unit opposed to at least one side surface of the first translucent substrate and the second translucent substrate is disclosed.

DETAILED DESCRIPTION

Embodiments described herein aim to provide a display device capable of suppressing the reduction in reliability.

In general, according to one embodiment, a display device comprises a first substrate comprising a first transparent substrate, a scanning line extending along a first direction, a signal line extending along a second direction intersecting the first direction, a switching element which comprises a drain electrode extending in the second direction and which is electrically connected to the scanning line and the signal line, a first connection electrode electrically connected to one end portion of the drain electrode, a pixel electrode overlapping the first connection electrode and electrically connected to the first connection electrode, and a feed line separated from the first connection electrode and arranged around the pixel electrode; a second substrate comprising a second transparent substrate having a side surface, and a common electrode opposed to the pixel electrode; a liquid crystal layer arranged between the first substrate and the second substrate and containing polymer dispersed liquid crystal; and a light emitting module arranged along the side surface. The feed line includes an edge extending along the second direction. The first connection electrode is a transparent electrode formed of a same material as the feed line, extends along the first direction, and includes an end portion opposed to the edge.

According to the embodiment, a display device capable of suppressing the reduction in reliability can be provided.

One of embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

Figure 1:
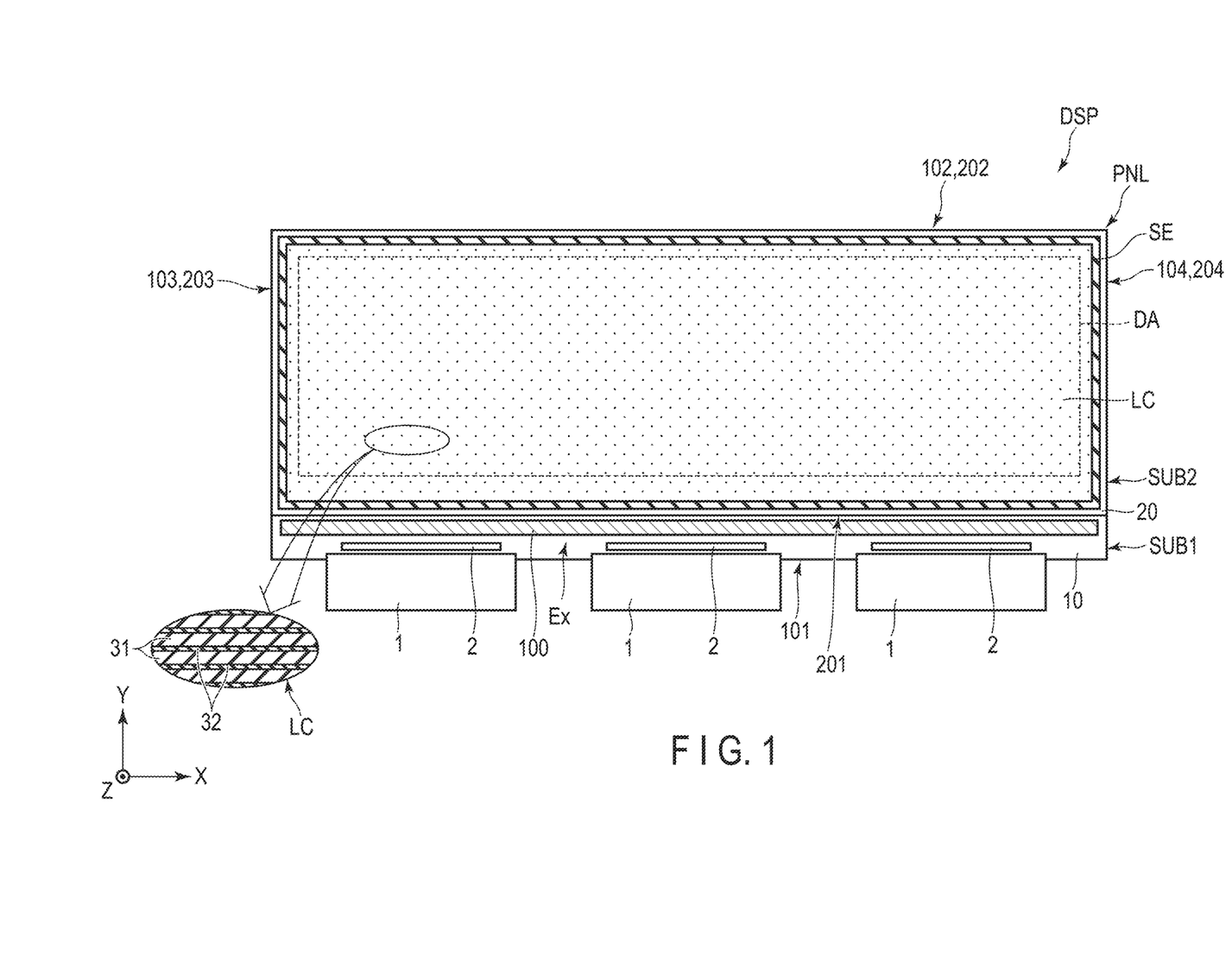
FIG. 1 is a plan view showing an example of a display device DSP according to an embodiment.

FIG. 1 is a plan view showing an example of a display device DSP according to the embodiment. As an example, the first direction X, the second direction Y, and the third direction Z are orthogonal to each other but may intersect at an angle other than 90 degrees. The first direction X and the second direction Y correspond to the directions parallel to the main surface of a substrate constituting the display device DSP, and the third direction Z corresponds to the thickness direction of the display device DSP. In the present embodiment, viewing an X-Y plane defined by the first direction X and the second direction Y is referred to as planar view.

The display device DSP comprises a display panel PNL, a wiring board 1, an IC chip 2, and a light emitting module 100.

The display panel PNL comprises a first substrate SUB1, a second substrate SUB2, a liquid crystal layer LC containing polymer dispersed liquid crystal, and a sealant SE. The first substrate SUB1 and the second substrate SUB2 are formed in a flat plate parallel to the X-Y plane. The first substrate SUB1 and the second substrate SUB2 overlap in planar view. An area where the first substrate SUB1 and the second substrate SUB2 overlap includes a display area DA where images are displayed.

The first substrate SUB1 comprises a first transparent substrate 10, and the second substrate SUB2 comprises a second transparent electrode 20. The first transparent substrate 10 has side surfaces 101 and 102 along the first direction X and side surfaces 103 and 104 along the second direction Y. The second transparent substrate 20 has side surfaces 201 and 202 along the first direction X and side surfaces 203 and 204 along the second direction Y.

In the example shown in FIG. 1, the side surfaces 102 and 202, the side surfaces 103 and 203, and the side surfaces 104 and 204 overlap, respectively, in planar view, but may not necessarily overlap. The side surface 201 does not overlap with the side surface 101 but is located between the side surface 101 and the display area DA. The first substrate SUB1 includes an extending portion Ex between the side surface 101 and the side surface 201. In other words, the extending portion Ex corresponds to a portion of the first substrate SUB1, which extends in the second direction Y from a portion overlapping with the second substrate SUB2, and does not overlap with the second substrate SUB2.

In addition, in the example shown in FIG. 1, the display portion PNL is formed in a rectangular shape extending in the first direction X. In other words, the side surfaces 101 and 102 and the side surfaces 201 and 202 are side surfaces along the long sides of the display panel PNL, and the side surfaces 103 and 104 and the side surfaces 203 and 204 are side surfaces along the short sides of the display panel PNL. The display panel PNL may be formed in a rectangular shape extending in the second direction Y, a square shape, the other polygonal shape, or the other shape such as a circular shape or an elliptical shape. The wiring board 1 and the IC chip 2 are mounted on the extending portion Ex. The wiring board 1 is, for example, a flexible printed circuit board that can be bent. The IC chip 2 incorporates, for example, a display driver which outputs signals necessary for image display, and the like. The IC chip 2 may be mounted on the wiring board 1. In the example shown in FIG. 1, a plurality of wiring boards 1 arranged in the first direction X are mounted on the display panel PNL, but a single wiring board 1 extending in the first direction X may be mounted. In addition, a plurality of IC chips 2 arranged in the first direction X are mounted on the display panel PNL, but a single IC chip 2 extending in the first direction X may be mounted.

Details of the light emitting module 100 will be described later, but the light emitting module 100 overlaps with the extending portion Ex and is arranged along the side surface 201 of the second transparent substrate 20 in planar view.

The sealant SE bonds the first substrate SUB1 and the second substrate SUB2. In addition, the sealant SE is formed in a rectangular frame shape, and surrounds the liquid crystal layer LC between the first substrate SUB1 and the second substrate SUB2.

The liquid crystal layer LC is held between the first substrate SUB1 and the second substrate SUB2. Such a Liquid crystal layer LC is arranged over an area (including the display area DA) surrounded by the sealant SE in planar view.

As enlarged and schematically shown in FIG. 1, the liquid crystal layer LC contains polymer 31 and liquid crystal molecules 32. As an example, the polymer 31 is liquid crystal polymer. The polymer 31 is formed in a stripe shape extending along the first direction X and is arranged in the second direction Y. The liquid crystal molecules 32 are dispersed in gaps of the polymer 31 and aligned such that their major axes extend in the first direction X. Each of the polymer 31 and the liquid crystal molecules 32 has optical anisotropy or refractive anisotropy. The response performance of the polymer 31 to the electric field is lower than the response performance of the liquid crystal molecules 32 to the electric field.

As an example, the direction of alignment of the polymer 31 is hardly varied irrespective of the presence of absence of the electric field. In contrast, the direction of alignment of the liquid crystal molecules 32 is varied in accordance with the electric field in a state in which a voltage higher than or equal to a threshold value is applied to the liquid crystal layer LC. In a state in which the voltage is not applied to the liquid crystal layer LC (initial alignment state), optical axes of the polymer 31 and the liquid crystal molecules 32 are parallel to each other and the light made incident on the liquid crystal layer LC is almost transmitted through the liquid crystal layer LC (transparent state). In a state in which a voltage is applied to the liquid crystal layer LC, the alignment direction of the liquid crystal molecules 32 changes, and the optical axes of the respective polymer 31 and liquid crystal molecules 32 intersect with each other. Therefore, the light made incident on the liquid crystal layer LC is scattered in the liquid crystal layer LC (scattered state).

Figure 2:
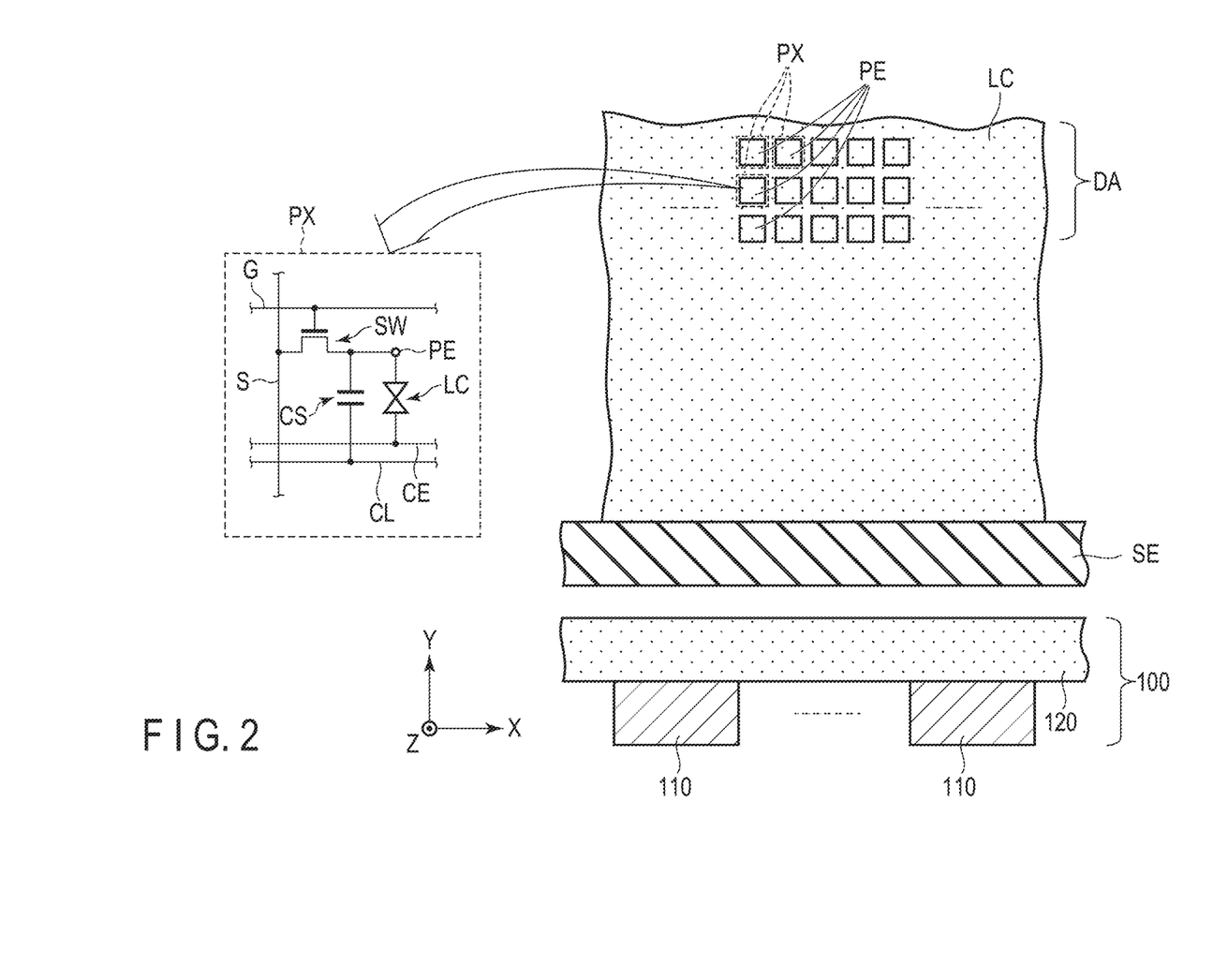
FIG. 2 is a plan view showing an area in the vicinity of the light emitting module 100.

FIG. 2 is a plan view showing an area in the vicinity of the light emitting module 100. The light emitting module 100 comprises a plurality of light emitting elements 110 and a light guide 120. The plurality of light emitting elements 110 are arranged in the first direction X. The light guide 120 is formed in a rod shape extending in the first direction X. The light guide 120 is located between the sealant SE and the Light emitting elements 110.

The display area DA comprises a plurality of pixels PX arranged in a matrix in the first direction X and the second direction Y. These pixels PX are shown by dotted lines in the figure. In addition, each of the pixels PX comprises a pixel electrode PE represented as a square of a solid line in the figure.

As shown and enlarged in FIG. 2, each pixel PX comprises a switching element SW. The switching element SW is constituted by, for example, a thin-film transistor (TFT) and is electrically connected to a scanning line G and a signal line S. The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW.

The common electrode CE and the feed Line CL are arranged over the display area DA and its surrounding area. A common voltage Vcom is applied to the common electrode CE. For example, a voltage having the same potential as the common electrode CE is applied to the feed line CL.

Each of the pixel electrodes PE is opposed to the common electrode CE in the third direction Z. In the display area DA, the liquid crystal layer LC (particularly, liquid crystal molecules 32) is driven by an electric field produced between the pixel electrode PE and the common electrode CE. A capacitance CS is formed, for example, between the feed line CL and the pixel electrode PE.

The scanning line G, the signal line S, the feed line CL, the switching element SW, and the pixel electrode PE are provided on the first substrate SUB1, and the common electrode CE is provided on the second substrate SUB2, which will be described later.

Figure 3:
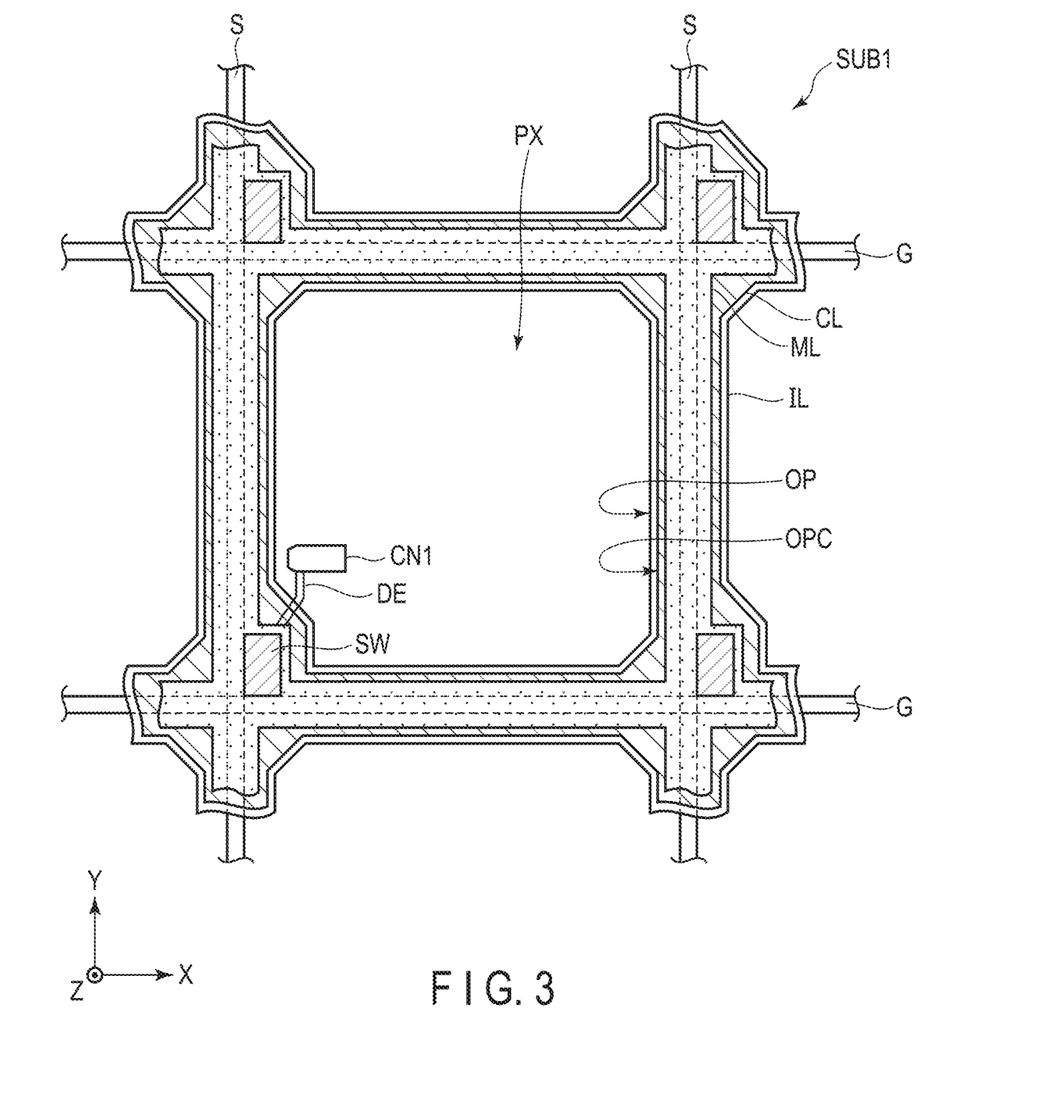
FIG. 3 is a plan view showing an example of the pixel PX.

FIG. 3 is a plan view showing an example of the pixel PX. Only a part of the configurations included in the first substrate SUB1 is shown in the figure.

The first substrate SUB1 comprises a plurality of scanning lines G, a plurality of signal lines S, a switching element SW, a feed line CL, a metal line ML, an insulating film IL, and a connection electrode (first connection electrode) CN1.

As described above, each of the plurality of scanning lines G extends in the first direction X. Each of the plurality of signal lines S extends in the second direction Y and intersects the plurality of scanning lines G. In the present specification, the pixel PX corresponds to an area defined by two adjacent scanning lines G and two adjacent signal lines S. The switching element SW is arranged at an intersection of the scanning line G and the signal line S.

The insulating film IL is formed in a grating pattern which defines an opening OP in each pixel PX. The insulating film IL is, for example, an organic insulating film. The insulating film IL overlaps with each of the scanning lines G, the signal lines S, and the switching element SW. However, a drain electrode DE of the switching element SW extends to the opening OP. The connection electrode CN1 is formed in an island shape, is located at the opening OP, and is electrically connected to one end portion of the drain electrode DE.

The feed line CL is arranged on the insulating film IL and is formed in a grating pattern surrounding the pixel PX. The planar shape of the feed line CL is substantially the same as the planar shape of the insulating film IL. The feed line CL is separated from the connection electrode CN1. An opening OPC of the feed line CL overlaps with the opening OP of the insulating film IL.

The metal line ML is arranged on the feed line CL and is formed in a grating pattern surrounding the pixel PX. The metal line ML is formed to have a width smaller than that of the feed line CL, and does not protrude from the feed line CL in planar view. These feed line CL and metal line ML overlap with each of the scanning line G, the signal line S, and the switching element SW.

Figure 4:
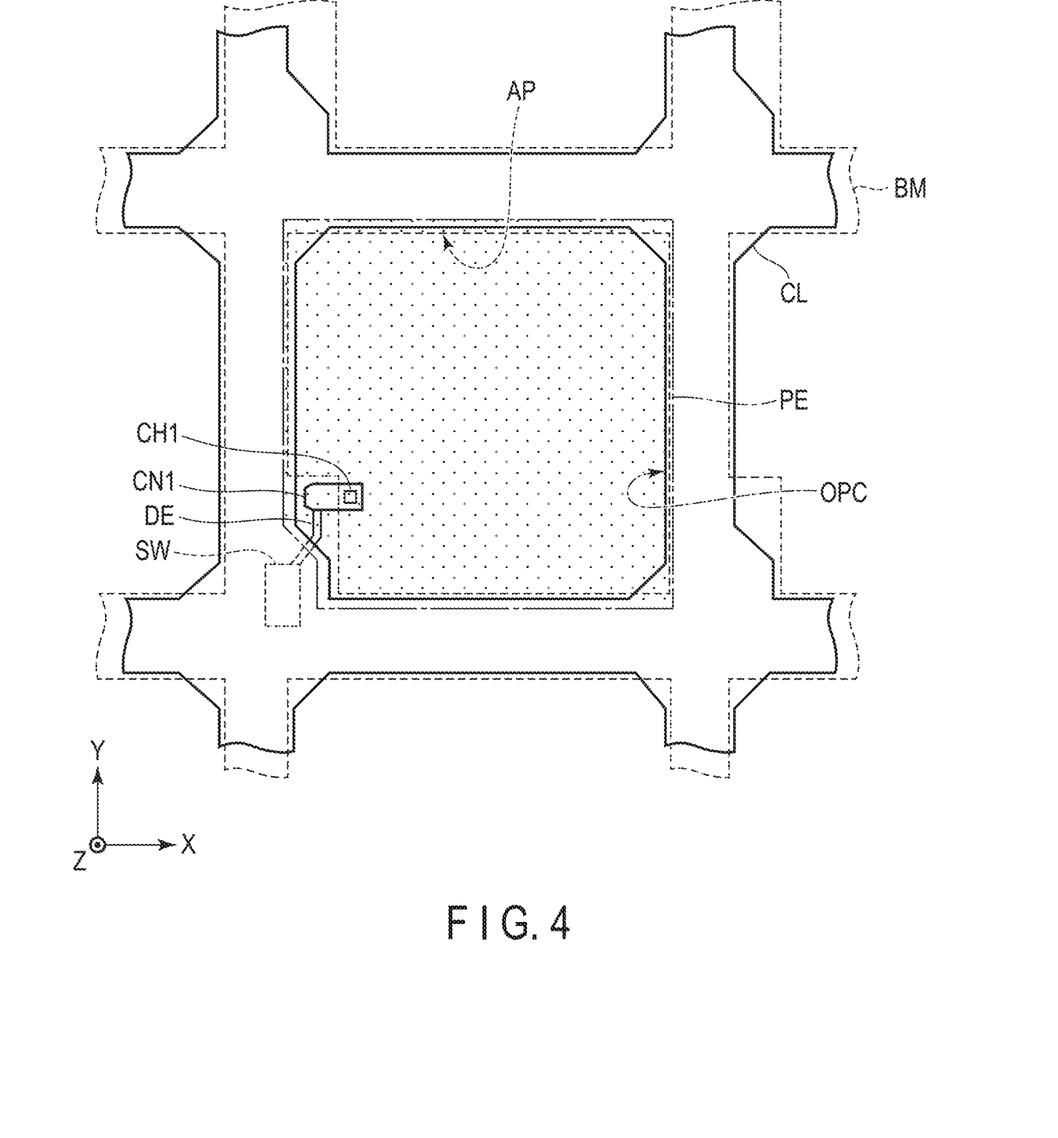
FIG. 4 is a plan view showing an example of the pixel electrode PE arranged in the pixel PX shown in FIG. 3.

FIG. 4 is a plan view showing an example of the pixel electrode PE arranged in the pixel PX shown in FIG. 3. The pixel electrode PE represented by a one-dot chain line overlaps with the opening OPC of the feed line CL. In addition, a peripheral portion of the pixel electrode PE overlaps with the feed line CL. An insulating film is interposed between the pixel electrode PE and the feed line CL, and the capacitance CS shown in FIG. 2 is formed between the peripheral portion of the pixel electrode PE and the feed line CL.

The connection electrode CN1 is located at the opening OPC. The pixel electrode PE overlaps with the connection electrode CN1 at the opening OPC. A contact hole CH1 is formed in the insulating film interposed between the pixel electrode PE and the connection electrode CN1. The pixel electrode PE is in contact with the connection electrode CN1 in the contact hole CH1. The pixel electrode PE is thereby electrically connected to the switching element SW.

In FIG. 4, a light-shielding layer BM provided on the second substrate SUB2 is represented by a dotted line. The light-shielding layer BM is formed in a grating pattern and overlaps with several parts of the feed line CL, the switching element SW, the connection electrode CN1, and the like in planar view. Of course, the light-shielding layer BM also overlaps with the scanning line G, the signal line S, and the metal line ML shown in FIG. 3. In addition, the light-shielding layer BM includes an aperture AP which overlaps with the pixel electrode PE in planar view. The contact hole CH1 is located in the aperture AP, which will be described later.

Figure 5:
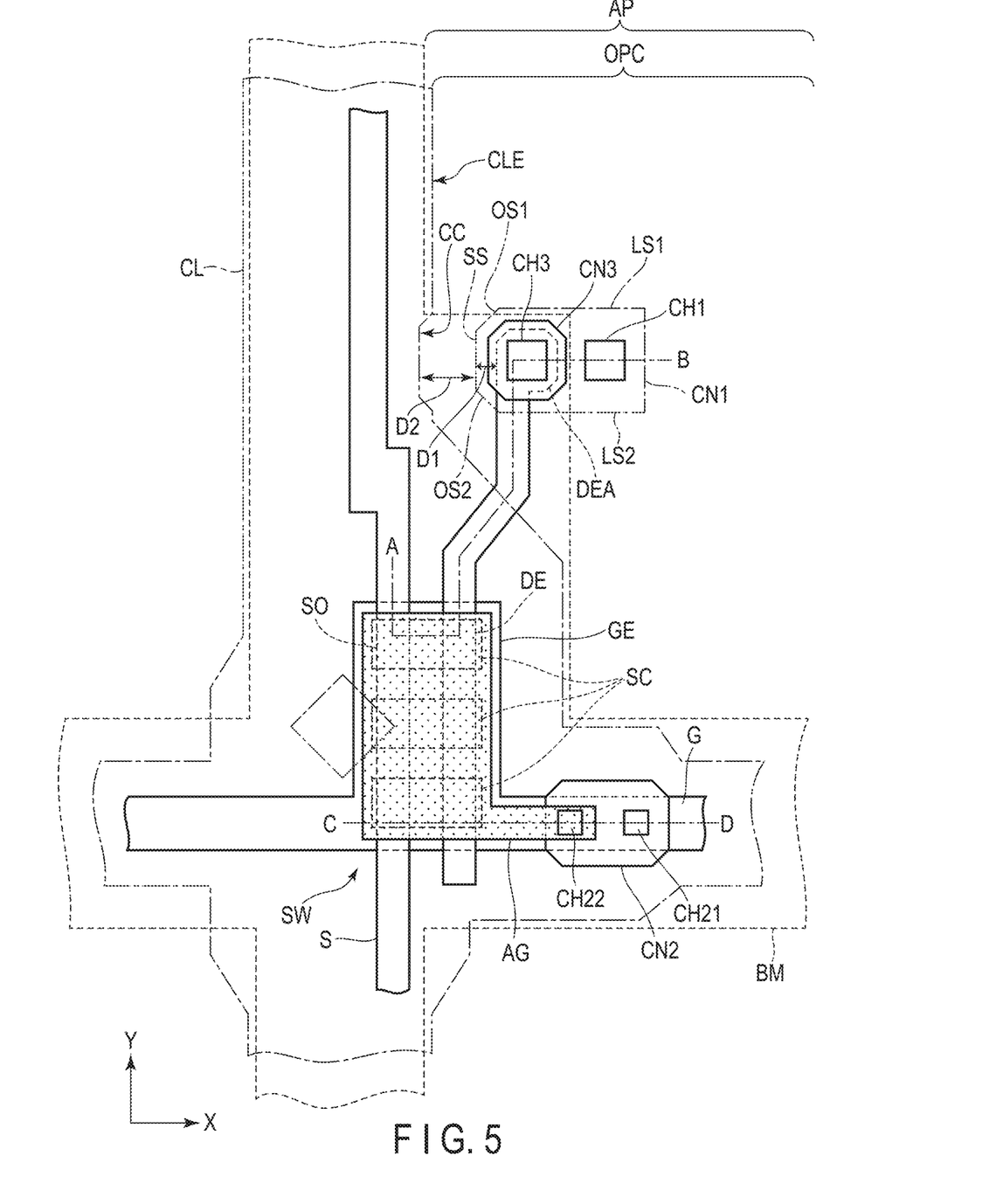
FIG. 5 is a plan view showing an example of the switching element SW shown in FIG. 4.

FIG. 5 is a plan view showing an example of the switching element SW shown in FIG. 4. The switching element SW comprises a semiconductors SC, a gate electrode GE integrated with the scanning line G, a source electrode SO integrated with the signal line S, the drain electrode DE, and an auxiliary gate electrode AG. The feed line CL represented by a one-dot chain line overlaps with the switching element SW.

The semiconductor SC is, for example, an oxide semiconductor, but may be polycrystalline silicon or amorphous silicon. In the example shown in FIG. 5, three semiconductors SC overlap with the gate electrode GE and are arranged at intervals along the second direction Y. The auxiliary gate electrode AG overlaps with the gate electrode GE and the semiconductors SC. The semiconductors SC are located between the gate electrode GE and the auxiliary gate electrode AG. The auxiliary gate electrode AG further overlaps with the scanning line G. A connection electrode CN2 is interposed between the scanning line G and the auxiliary gate electrode AG.

A contact hole CH21 is formed in an insulating film interposed between the scanning line G and the connection electrode CN2. The connection electrode CN2 is in contact with the scanning line G in the contact hole CH21. A contact hole CH22 is formed in an insulating film interposed between the connection electrode CN2 and the auxiliary gate electrode AG. The auxiliary gate electrode AG is in contact with the connection electrode CN2 in the contact hole CH22. The auxiliary gate electrode AG is thereby electrically connected to the scanning line G, similarly to the gate electrode GE. In other words, the gate electrode GE and the auxiliary gate electrode AG have the same potential as the scanning line G.

Each of the source electrode SO and the drain electrode DE extends along the second direction Y, and the source electrode SO and the drain electrode DE are arranged at intervals along the first direction X. The source electrode SO is in contact with one end side of each of the semiconductors SC. The drain electrode DE is in contact with the other end side of each of the semiconductors SC. The drain electrode DE bends in the middle and extends to the opening OPC.

One end portion DEA of the drain electrode DE is located at the opening OPC and overlaps with a connection electrode (second connection electrode) CN3. A contact hole CH3 is formed in an insulating film interposed between the drain electrode DE and the connection electrode CN3. The drain electrode DE is in contact with the connection electrode CN3 in the contact hole CH3.

The connecting electrode CN1 represented by a one-dot chain line is in contact with the connection electrode CN3. The connection electrode CN1 is thereby electrically connected to the switching element SW, and electrically connected to the pixel electrode PE shown in FIG. 4 in the contact hole CH1. The connection electrode CN1 is a transparent electrode formed of the same material as the feed line CL, and the drain electrode DE and the connection electrode CN3 are formed of a metal material, which will be described later.

The connection electrode CN1 is formed in a longitudinally elongated shape extending along the first direction X, and includes an end portion SS opposed to an edge CLE of the feed line CL, which extends along the second direction Y. As an example, the end portion SS corresponds to a short side of the connection electrode CN1, which extends along the second direction Y. In addition to the short side (end portion) SS, the connection electrode CN1 includes long sides LS1 and LS2 extending along the first direction, and oblique sides OS1 and OS2 extending along an oblique direction intersecting the first direction X and the second direction Y. The oblique side OS1 connects the short side SS with the long side LS1, and the oblique side OS2 connects the short side SS with the long side LS2.

In planar view, the contact hole CH1 is formed at a position which does not overlap with the drain electrode DE or the connection electrode CN3. The contact hole CH3 and the contact hole CH1 are arranged in the first direction X. In addition, the drain electrode DE and the contact hole CH1, or the connection electrode CN3 and the contact hole CH1 are arranged in the first direction X. The contact hole CH3, the drain electrode DE, and the connection electrode CN3 are located between the feed line CL and the contact hole CH1 in the first direction X.

In addition, in planar view, the short side SS is located between the feed line CL and the drain electrode DE (or the connection electrode CN3). A distance D1 along the first direction X between the short side SS and the drain electrode DE is smaller than a distance D2 along the first direction X between the short side SS and the feed line CL.

The feed line CL includes a recess CC opposed to the connection electrode CN1 in planar view. In the feed line CL, that is, a part of the edge CLE extending along the second direction Y is recessed. In other words, with respect to the width along the first direction X, of the feed line CL extending along the second direction Y, the width of the portion adjacent to the connection electrode CN1 is smaller than the width of the other portions. For this reason, the distance D2 between the feed line CL and the connection electrode CN1 can be increased as compared with a case where the edge CLE is formed linearly.

In FIG. 5, the light-shielding layer BM is represented by a dotted line. The light-shielding layer BM overlaps with the drain electrode DE, the connection electrode CN3, and the contact hole CH3, and does not overlap with the contact hole CH1, in planar view. In other words, the contact hole CH1 is located at the aperture AP of the light-shielding layer BM. In short, the connection electrode CN1 is a transparent electrode as described above, but the part of the connection electrode CN1 which overlaps with the drain electrode DE and the connection electrode CN3 formed of the metal material overlaps with the light-shielding layer BM, and the other parts of the connection electrode CN1 overlap with the aperture AP.

Figure 6:
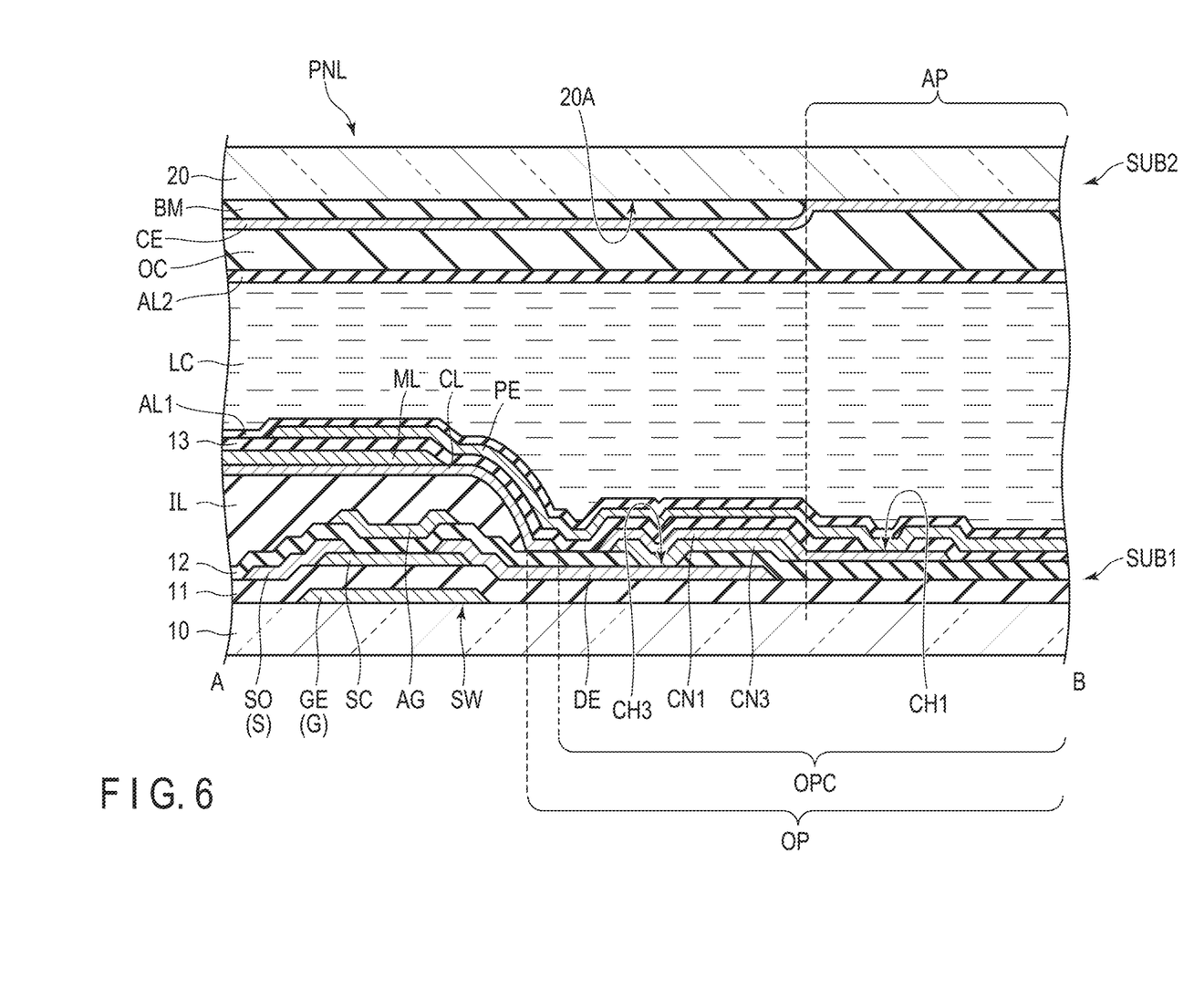
FIG. 6 is a cross-sectional view showing an example of the display panel PNL including the first substrate SUB1 along line A-B shown in FIG. 5.

FIG. 6 is a cross-sectional view showing an example of the display panel PNL including the first substrate SUB1 along line A-B shown in FIG. 5. The first substrate SUB1 comprises the first transparent substrate 10, the insulating films 11 to 13, the insulating film IL, the switching element SW, the feed line CL, the metal line ML, the pixel electrode PE, and the alignment film AL1.

The gate electrode GE integrated with the scanning line G is arranged on the first transparent substrate 10. The insulating film 11 covers the first transparent substrate 10 and the gate electrode GE. The semiconductor SC is arranged on the insulating film 11 and is located directly above the gate electrode GE. The source electrode SO integrated with the signal line S, and the drain electrode DE are arranged on the insulating film 11 and each of the electrodes is in contact with the semiconductor SC. These source electrode SO and drain electrode DE are formed of the same metal material. The insulating film 12 covers the insulating film 11, the source electrode SO, and the drain electrode DE. In addition, the insulating film 12 is in contact with the semiconductor SC at a position between the source electrode SO and the drain electrode DE.

The auxiliary gate electrode AG is arranged on the insulating film 12 and is located directly above the gate electrode GE and the semiconductor SC. The connection electrode CN3 is arranged on the insulating film 12 and is in contact with the drain electrode DE in the contact hole CH3 formed in the insulating film 12. The auxiliary gate electrode AG and the connection electrode CN3 are formed of the same metal material. The insulating film IL covers the auxiliary gate electrode AG. In contrast, the connection electrode CN3 is located at the opening OP and is exposed from the insulating film IL.

The feed line CL is arranged on the insulating film IL. The connection electrode CN1 is separated from the feed line CL and is arranged on the insulating film 12 in the opening OP of the insulating film IL or the opening OPC of the feed line CL. In other words, these feed line CL and connection electrode CN1 are substantially located in the same layer, and are collectively formed by using the same material. The connection electrode CN1 is arranged on the connection electrode CN3 and is in contact with the connection electrode CN3.

The metal line ML is arranged on the feed line CL and is in contact with the feed line CL. The insulating film 13 covers the feed line CL, the metal line ML, and the connection electrode CN1. In addition, the insulating film 13 is in contact with the insulating film 12 between the feed line CL and the connection electrode CN1.

The pixel electrode PE is arranged on the insulating film 13 and is in contact with the connection electrode CN1 in the contact hole CH1 formed in the insulating film 13. A peripheral portion of the pixel electrode PE is opposed to the feed line CL and the metal line ML via the insulating film 13. The alignment film AL1 covers the pixel electrode PE and the insulating film 13.

The insulating films 11 to 13 are, for example, transparent inorganic insulating films of silicon oxide, silicon nitride, silicon oxynitride or the like. The insulating film IL is, for example, a transparent organic insulating film of an acrylic resin or the like. The feed line CL, the connection electrode CN1, and the pixel electrode PE are transparent electrodes formed of a transparent conductive material such as indium tin oxide (ITO) or Indium zinc oxide (IZO). In other words, both the connection electrode CN1 and the pixel electrode PE which are in contact with each other in the contact hole CH1 are transparent.

The second substrate SUB2 comprises the second transparent substrate 20, the light-shielding layer BM, the common electrode CE, an overcoat layer OC, and an alignment film AL2.

The light-shielding layer BM is arranged on an inner surface 20A of the second transparent substrate 20. The light-shielding layer BM is opposed to the switching element SW, the insulating film IL, the feed line CL, the metal line ML, the connection electrode CN3, the contact hole CH3, and the like via the liquid crystal layer LC. The aperture AP of the light-shielding layer BM is opposed to the pixel electrode PE, the contact hole CH1, and the like via the liquid crystal layer LC. The common electrode CE overlaps with the light-shielding layer BM, is arranged on the inner surface 20A at the aperture AP, and is opposed to the pixel electrode PE via the liquid crystal layer LC. The overcoat layer OC is a transparent organic insulating film and covers the common electrode CE. The alignment film AL2 covers the overcoat layer. However, the overcoat layer OC may be omitted in the second substrate SUB2. In this case, the alignment film AL2 directly covers the common electrode CE.

Figure 7:
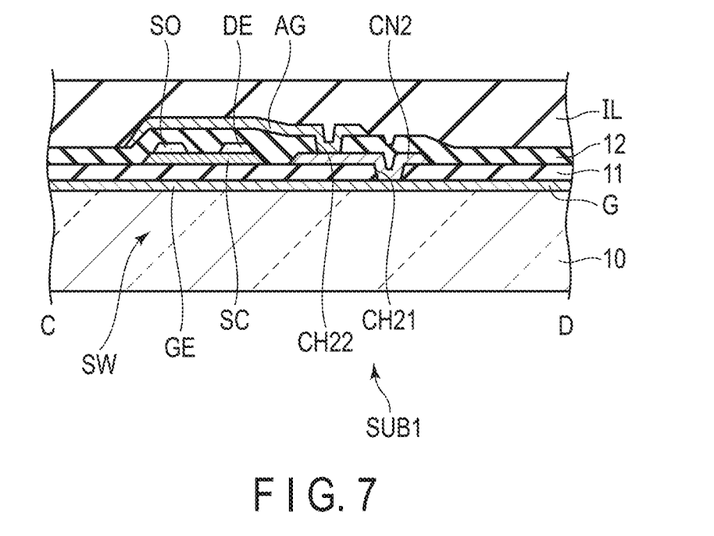
FIG. 7 is a cross-sectional view showing an example of the first substrate SUB1 along line C-D shown in FIG. 5.

FIG. 7 is a cross-sectional view showing an example of the first substrate SUB1 along line C-D shown in FIG. 5. The connection electrode CN2 is arranged on the insulating film 11 and is in contact with the scanning line G in the contact hole CH21 formed in the insulating film 11. The connection electrode CN2 is formed of the same metal material as the source electrode SO and the drain electrode DE. The insulating film 12 covers the insulating film 11, the connection electrode CN2, the source electrode SO, and the drain electrode DE. The auxiliary gate electrode AG is arranged on the insulating film 12 and is in contact with the connection electrode CN2 in the contact hole CH 22 formed in the insulating film 12.

As described above, the feed line CL and the connection electrode CN1 are arranged in substantially the same layer and formed in the same process using the same material, but are required to be electrically insulated from each other. In the present embodiment, the connection electrode CN1 extends along the first direction X and includes an end portion or a short side SS that is opposed to the edge CLE of the feed line CL extending along the second direction Y. For this reason, the risk of a short circuit between the feed line CL and the connection electrode CN1 can be reduced as compared with a case where the edge CLE and the long side LS1 of the connection electrode CN1 are opposed to each other.

In addition, the feed line CL includes a recess CC opposed to the connection electrode CN1. For this reason, the distance between the feed line CL and the connection electrode CN1 can be increased and a risk of a short circuit between the feed line CL and the connection electrode CN1 can be further reduced, as compared with a case where the edge CLE is formed linearly. The reduction in reliability can be therefore suppressed.

The contact hole CH1 where the connection electrode CN1 and the pixel electrode PE are in contact with each other is formed at a position which does not overlap with the drain electrode DE and the connection electrode CN3. The light-shielding layer BM overlaps with the drain electrode DE and the connection electrode CN3, and does not overlap with the contact hole CH1. The drain electrode DE and the connection electrode CN3 are formed of a metal material, but undesired reflected light from the drain electrode DE and the connection electrode CN3 is blocked by the light-shielding layer BM. For this reason, degradation in display quality caused by undesired reflected light is suppressed.

In addition, the reflectance of the connection electrode CN1 and the pixel electrode PE formed as the transparent electrodes is smaller than the reflectance of the drain electrode DE and the connection electrode CN3 formed as the metal electrodes. For this reason, even if the area including the contact hole CH1 overlaps with the aperture AP, the influence of undesired reflected light from the connection electrode CN1 and the pixel electrode PE to the display quality can be almost ignored. Rather, since the area including the contact hole CH1 overlaps with the aperture AP, the area contributing to the display can be increased and the brightness of the displayed images can be improved.

Figure 8:
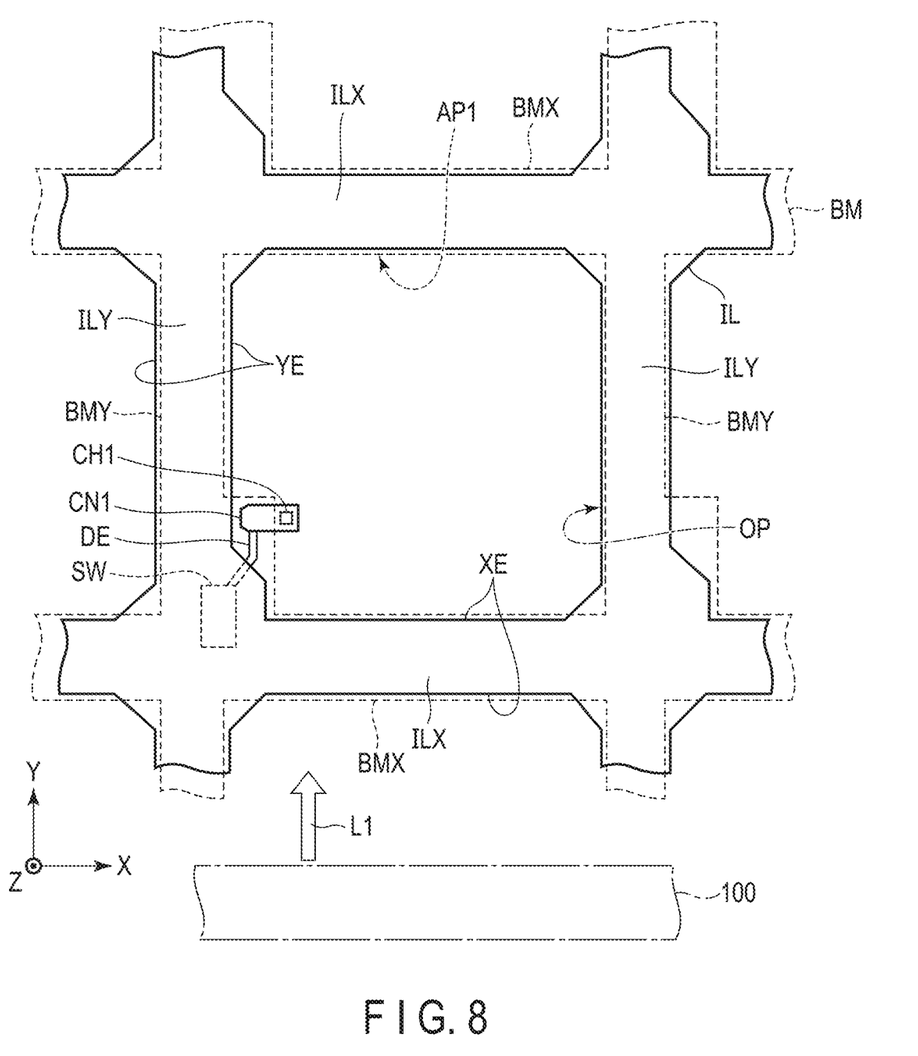
FIG. 8 is a plan view showing an example of the insulating film IL and the light-shielding layer BM shown in FIG. 3.

FIG. 8 is a plan view showing an example of the insulating film IL and the light-shielding layer BM shown in FIG. 3. The insulating film IL which is an organic insulating film is formed in a grating pattern which defines the opening OP as described above. The insulating film IL includes a part ILX extending along the first direction X and a part ILY extending along the second direction Y.

The light-shielding layer BM represented by a dotted line is formed in a grating pattern and overlaps with the insulating film IL in planar view. The light-shielding layer BM includes a part BMX extending along the first direction X and a part BMY extending along the second direction Y. A width of the part BMX is larger than a width of the part ILX, and the part BMX overlaps with the first edge XE extending along the first direction X, in the part ILX. A width of the part BMY is smaller than a width of the part ILY, and the part BMY does not overlap with the second edge YE extending along the second direction Y, in the part ILY.

Light L1 emitted from the light emitting module 100 propagates along the second direction Y. At this time, even if undesired scattering light occurs in the vicinity of the first edge XE of the insulating film IL, which is substantially orthogonal to the propagation direction of the light L1, the Light is blocked by the part BMX overlapping with the part ILX. For this reason, degradation in display quality can be suppressed.

Scattering almost does not occur, in the vicinity of the second edge YE which is substantially parallel to the propagation direction of the light L1, of the insulating film IL. For this reason, the influence of undesired scattering light in the vicinity of the second edge YE to the display quality can be almost ignored. Rather, since the vicinity of the second edge YE overlaps with the aperture AP, the area contributing to the display increases, and the brightness of the displayed images can be improved.

Next, another configuration example will be described.

Figure 9:
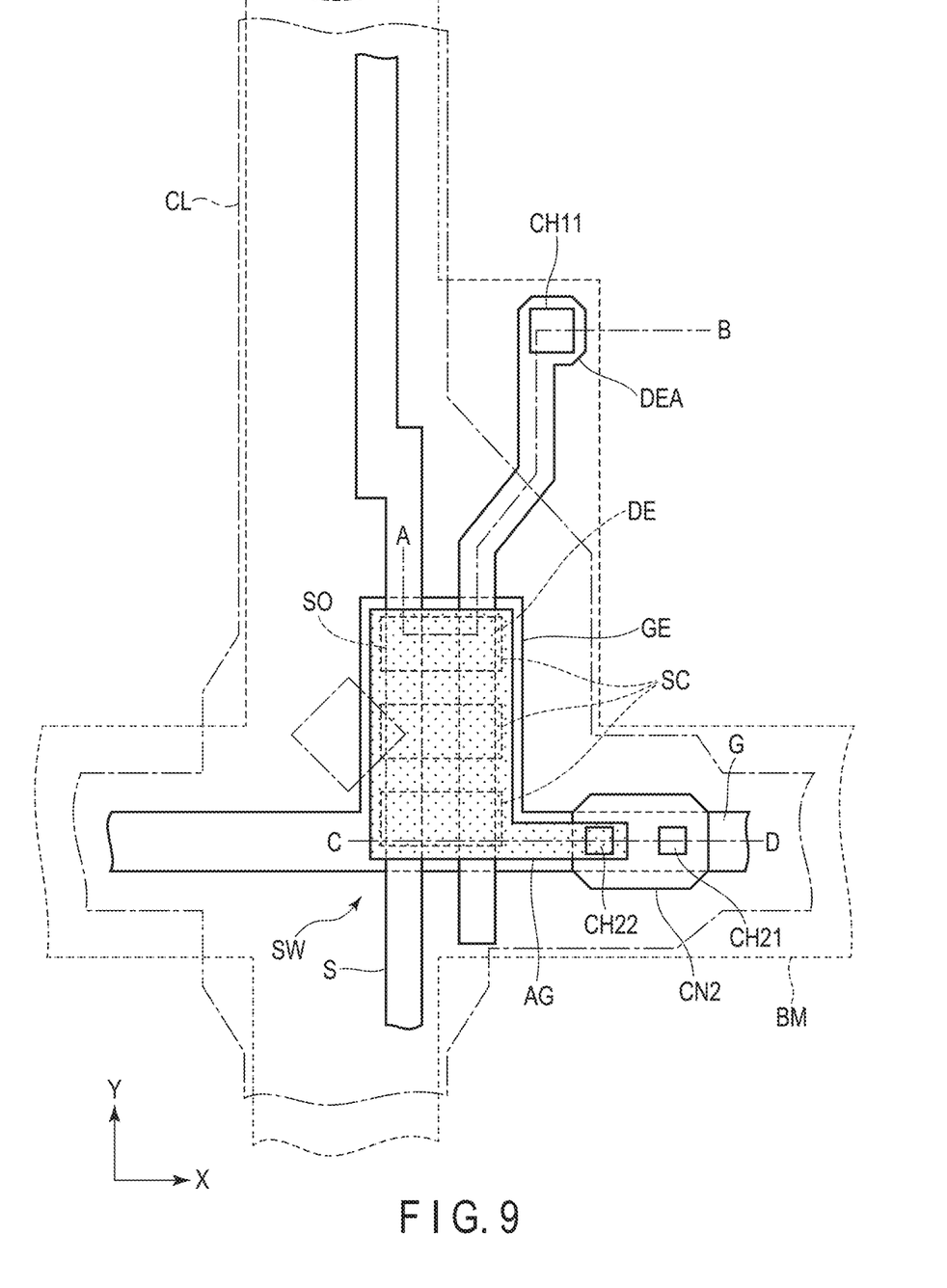
FIG. 9 is a plan view showing another configuration example.

FIG. 9 is a plan view showing another configuration example. The configuration of the switching element SW is the same as the example shown in FIG. 5, and its description will be omitted.

The configuration example shown in FIG. 9 is different from the example shown in FIG. 5 in that the connection electrode CN1 and the connection electrode CN3 are omitted. In other words, the pixel electrode PE shown in FIG. 4 is in contact with the drain electrode DE and is electrically connected to the switching element SW, in the contact hole CH11 overlapping with the one end portion DEA of the drain electrode DE. The light-shielding layer BM represented by a dotted line overlaps with the drain electrode DE and the contact hole CH11 in planar view.

Figure 10:
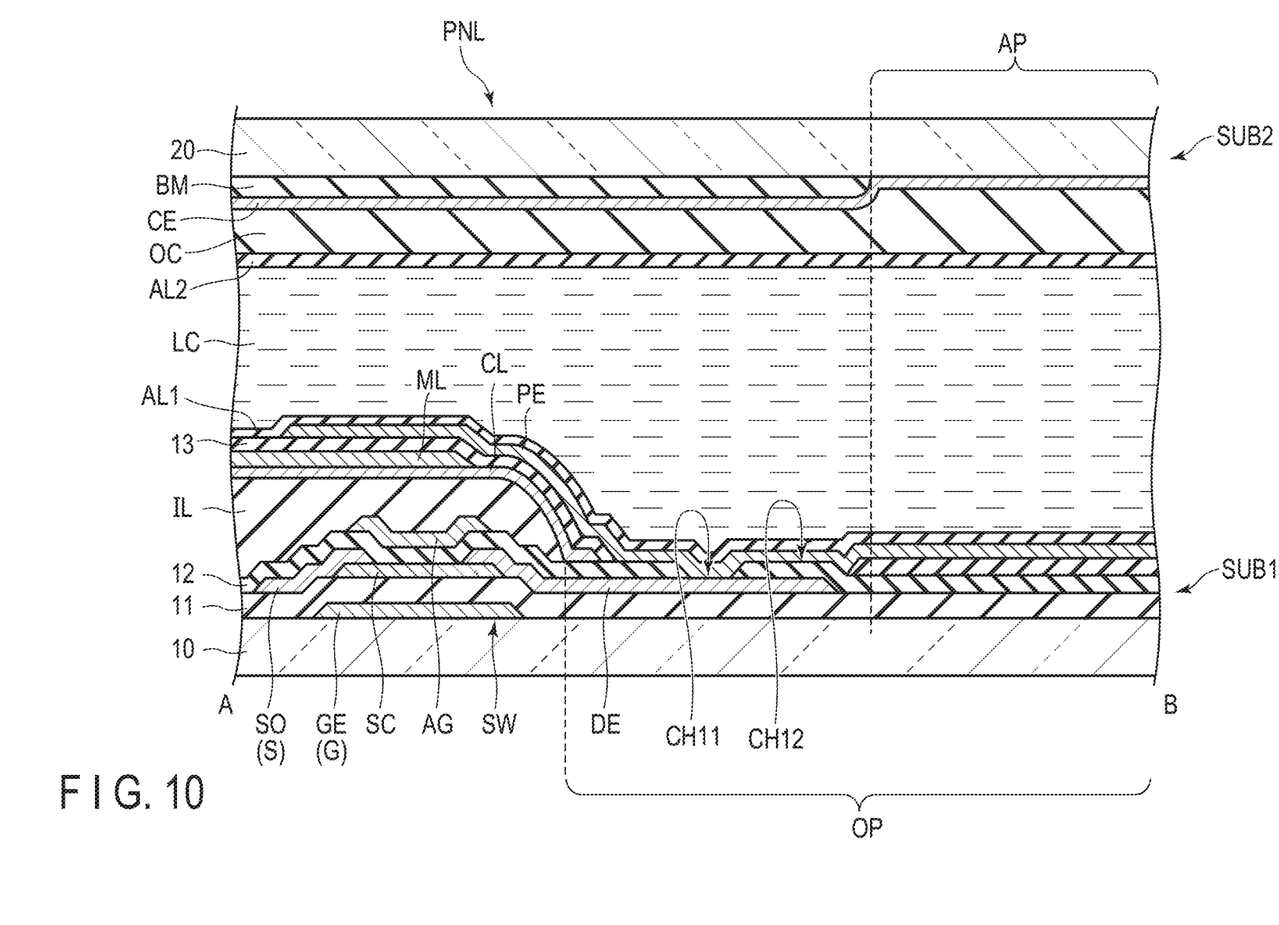
FIG. 10 is a cross-sectional view showing an example of the display panel PNL0 including the first substrate SUB1 along line A-B shown in FIG. 9.

FIG. 10 is a cross-sectional view showing an example of the display panel PNL including the first substrate SUB1 along line A-B shown in FIG. 9. Differences from the example shown in FIG. 6 will be mainly described.

The insulating film 12 includes the contact hole CH11 penetrating to the drain electrode DE, at the opening OP of the insulating film IL. The insulating film 13 covers the feed line CL, the metal line ML, the connection electrode CN1, and the insulating film 12. The insulating film 13 includes a contact hole CH12 which penetrates to the insulating film 12, at the opening OP. The contact hole CH12 overlaps with the contact hole CH11.

The pixel electrode PE is arranged on the insulating film 13, and is in contact with the insulating film 12 in the contact hole CH12 and further in contact with the drain electrode DE in the contact hole CH11. The Light-shielding layer BM is opposed to the switching element SW, the insulating film IL, the feed line CL, the metal line ML, the drain electrode DE, the contact holes CH11 and CH12, and the like, via the liquid crystal layer LC. The aperture AP of the light-shielding layer BM is opposed to the pixel electrode PE or the like via the liquid crystal layer LC.

In another configuration example, too, the same advantages as those described above can be obtained. In addition, since the connection electrode CN1 is omitted, a short circuit between the feed line CL and the pixel electrode PE can be prevented.

Next, a configuration example of the display device DSP according to the embodiment will be described.

Figure 11:
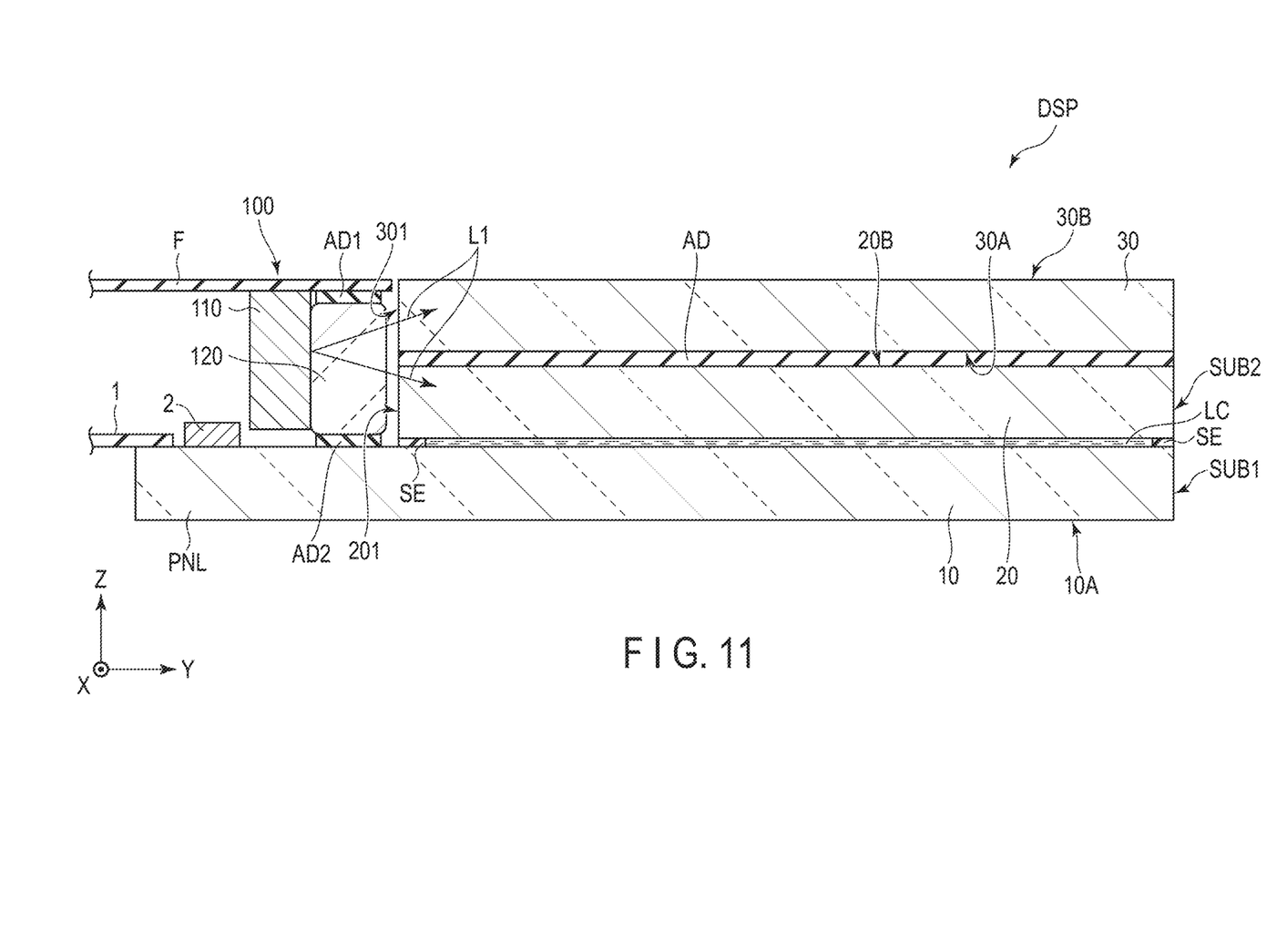
FIG. 11 is a cross-sectional view of the display device DSP.

FIG. 11 is a cross-sectional view of the display device DSP. The only main parts of the display panel PNL are simplified and illustrated.

The display panel PNL further comprises a third transparent substrate 30 in addition to the first substrate SUB1 and the second substrate SUB2. An inner surface 30A of the third transparent substrate 30 is opposed to an outer surface 20B of the second transparent substrate 20 in the third direction Z. An adhesive layer AD bonds the second transparent substrate 20 and the third transparent substrate 30. The third transparent substrate 30 is, for example, a glass substrate, but may be an insulating substrate such as a plastic substrate. The third transparent substrate 30 has a refractive index equivalent to the refractive indexes of the first transparent substrate 10 and the second transparent substrate 20. The adhesive layer AD has a refractive Index equivalent to the refractive index of each of the second transparent substrate 20 and the third transparent substrate 30.

A side surface 301 of the third transparent substrate 30 is located directly above the side surface 201 of the second transparent substrate 20. The Light emitting element 110 of the light emitting module 100 is electrically connected to the wiring board F and is provided between the first substrate SUB1 and the wiring board F in the third direction Z. The Light guide 120 is provided between the light emitting element 110 and the side surface 201 and between the light emitting element 110 and the side surface 301, in the second direction Y. The light guide 120 is bonded to the wiring board F by the adhesive layer AD1 and is bonded to the first substrate SUB1 by the adhesive layer AD2.

Next, the light L1 emitted from the light emitting element 110 will be described with reference to FIG. 11.

The light emitting element 110 emits the light L1 toward the light guide 120. The light L1 emitted from the light emitting element 110 propagates along a direction of an arrow indicating the second direction Y, passes through the light guide 120, is made incident on the second transparent substrate 20 from the side surface 201, and is made incident on the third transparent substrate 30 from the side surface 301. The light L1 made incident on the second transparent substrate 20 and the third transparent substrate 30 propagates through the inside of the display panel PNL while repeatedly reflected. The light L1 made incident on the liquid crystal layer LC to which no voltage is applied, almost is not scattered, but is transmitted through the liquid crystal layer LC. In addition, the light L1 made incident on the liquid crystal layer LC to which a voltage is applied is scattered by the liquid crystal layer LC.

This display device DSP can be observed not only from the outer surface 10A side of the first transparent substrate 10, but also from the outer surface 30B side of the third transparent substrate 30. In addition, even when the display device DSP is observed from the outer surface 10A side of observed from the outer surface 30B side, a background of the display device DSP can be observed via the display device DSP.

As described above, according to the present embodiment, the display device capable of suppressing the reduction in reliability can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate comprising a first transparent substrate, a scanning line extending along a first direction, a signal line extending along a second direction intersecting the first direction, a switching element which comprises a drain electrode extending in the second direction and which is electrically connected to the scanning line and the signal line, a first connection electrode electrically connected to one end portion of the drain electrode, a pixel electrode overlapping the first connection electrode and electrically connected to the first connection electrode, a feed line separated from the first connection electrode and arranged around the pixel electrode;
a contact hole where the first connection electrode and the pixel electrode are in contact with each other, formed at a position which does not overlap the drain electrode in planar view;
a second substrate comprising a second transparent substrate having a side surface, and a common electrode opposed to the pixel electrode;
a liquid crystal layer arranged between the first substrate and the second substrate and containing polymer dispersed liquid crystal; and
a light emitting module arranged along the side surface, wherein
the feed line includes an edge extending along the second direction,
the first connection electrode is a transparent electrode formed of a same material as the feed line, extends along the first direction, and includes an end portion opposed to the edge, and
the drain electrode is located between the feed line and the contact hole in the first direction.

2. The display device of claim 1, wherein
the end portion of the first connection electrode is a short side extending along the second direction,
the short side is located between the feed line and the drain electrode, in planar view, and
a distance between the short side and the drain electrode is smaller than a distance between the short side and the feed line.

3. The display device of claim 1, wherein
the feed line includes a recess opposed to the first connection electrode in planar view.

4. The display device of claim 1, wherein
the second substrate further comprises a light-shielding layer, and
the light-shielding layer overlaps the drain electrode and does not overlap the contact hole, in planar view.

5. The display device of claim 1, wherein
the first substrate further comprises a second connection electrode interposed between the drain electrode and the first connection electrode, and
the second connection electrode is located between the feed line and the contact hole in the first direction.

6. The display device of claim 5, wherein
the second substrate further comprises a light-shielding layer, and
the light-shielding layer overlaps the second connection electrode and does not overlap the contact hole, in planar view.

7. A display device comprising:
a first substrate comprising a first transparent substrate, a scanning line extending along a first direction, a signal line extending along a second direction intersecting the first direction, a switching element which comprises a drain electrode extending in the second direction and which is electrically connected to the scanning line and the signal line, a first connection electrode electrically connected to one end portion of the drain electrode, a pixel electrode overlapping the first connection electrode and electrically connected to the first connection electrode, and a feed line separated from the first connection electrode and arranged around the pixel electrode;

a second substrate comprising a second transparent substrate having a side surface, and a common electrode opposed to the pixel electrode;

a liquid crystal layer arranged between the first substrate and the second substrate and containing polymer dispersed liquid crystal; and a light emitting module arranged along the side surface, wherein the feed line includes an edge extending along the second direction, the first connection electrode is a transparent electrode formed of a same material as the feed line, extends along the first direction, and includes an end portion opposed to the edge, the first substrate further comprises an organic insulating film overlapping the scanning line, the signal line, and the switching element, the organic insulating film includes a first edge extending along the first direction and a second edge extending along the second direction, the second substrate further comprises a light-shielding layer, and the light-shielding layer overlaps the first edge and does not overlap the second edge, in planar view.

* * * * *